United States Patent
Wood

(10) Patent No.: US 6,814,386 B2
(45) Date of Patent: Nov. 9, 2004

(54) VEHICLE CONTAINER COVER

(76) Inventor: Robert Arthur Wood, The Railway Sidings Wested Lane, Swanley, Kent (GB), BR8 8EE ( * ) Notice: Subject to any disclaimer, the term of this patent is extended or adjusted under 35 U.S.C. 154(b) by 0 days.

(21) Appl. No.: 10/462,827

(22) Filed: Jun. 17, 2003

(65) Prior Publication Data
US 2004/0021336 A1 Feb. 5, 2004

(30) Foreign Application Priority Data

Jun. 18, 2002 (GB) ............................................. 0213994

(51) Int. Cl.[7] ................................................. B60P 7/02
(52) U.S. Cl. ...................................................... 296/98
(58) Field of Search ............................. 296/98, 100.01, 296/100.11, 100.13, 100.14, 100.15, 100.17, 100.18; 160/66, 67

(56) References Cited

U.S. PATENT DOCUMENTS

| 4,050,734 A | * | 9/1977 | Richard | 296/98 |
|---|---|---|---|---|
| 4,126,351 A | | 11/1978 | Peteretti | |
| 4,341,416 A | * | 7/1982 | Richard | 296/98 |
| 4,874,196 A | * | 10/1989 | Goldstein et al. | 296/98 |
| 5,180,203 A | * | 1/1993 | Goudy | 296/98 |
| 6,338,521 B1 | * | 1/2002 | Henning | 296/100.15 |
| 6,474,718 B1 | * | 11/2002 | Henning | 296/98 |
| 6,637,800 B2 | * | 10/2003 | Henning | 296/100.15 |

* cited by examiner

Primary Examiner—Patricia Engle
(74) Attorney, Agent, or Firm—Dowell & Dowell, P.C.

(57) ABSTRACT

A cover assembly for a truck having a material carrying container wherein the cover assembly includes a retractable cover having a first end attached to a roller assembly and a second end attached to a cover support element. The cover support element has two ends, each of which is joined at the upper end of a pair of variable length pivot arms which are pivotable about a lower end thereof at a point intermediate two ends of the container and adjacent the bottom of the container, between a first position in which the cover support element is adjacent a first end of the container and a second position in which the cover support element is adjacent a second end of the container.

5 Claims, 3 Drawing Sheets

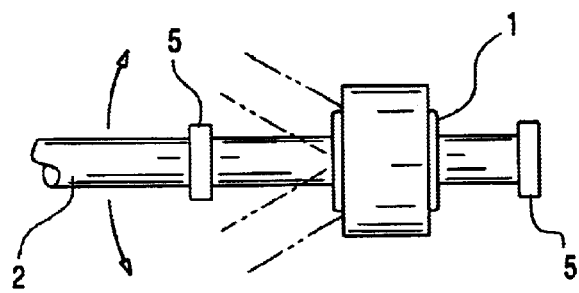
FIG.4
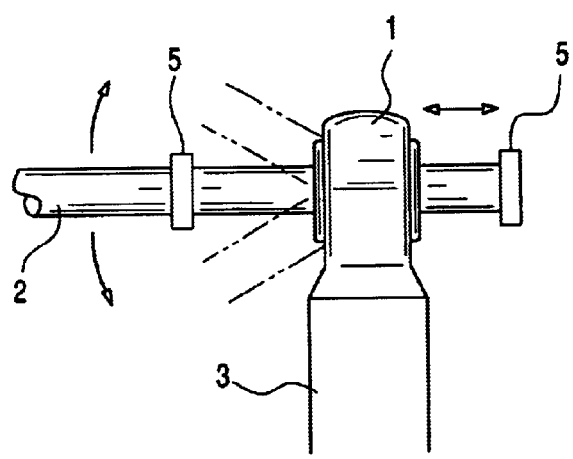
FIG.3
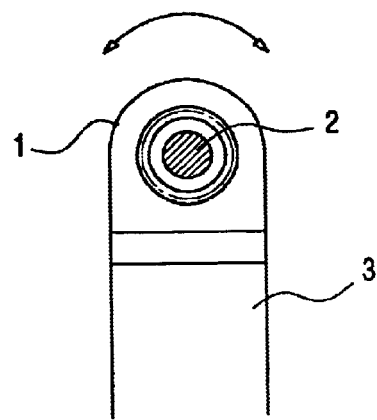
FIG.5
FIG.6
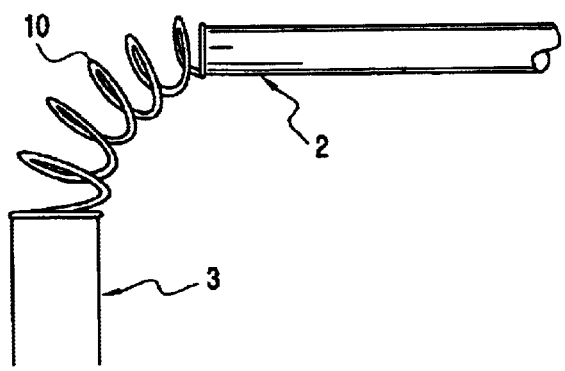

VEHICLE CONTAINER COVER

BACKGROUND OF THE INVENTION

Field of the Invention

The present invention relates to a container cover. In particular, it relates to a device used for covering the open top of vehicular containers that are carried by or on trucks, trailers, roll-on/roll-off hoists, and similar vehicles.

It is well known to provide a cover for the material carrying container of a truck. Such covers are particularly useful when transporting loose materials such as garbage, sand, or gravel, to prevent the load from being blown out of the container by the wind. Additionally, the cover protects the load from contamination. Many examples of container covers are known in the prior art. A popular arrangement for covering a truck container is to use a tarpaulin (or 'tarp') or other flexible cover, mounted upon a roller assembly adjacent one end of the truck container. The tarp is pulled from one end of the truck to the other by means of a front-to-rear pivot arm assembly.

There are many variations of pivot arm style covering assemblies that pull a flexible cover over the top of an open top container mounted to or carried on a truck chassis. Typically the pivot arms are powered between a first and second position on the truck by a spring force or hydraulic cylinder that is coupled to the pivot arms in the vicinity of the pivot point. The pivot arms may be fixed in length or variable in lengths by way of a telescoping feature. Whether the arms are fixed or variable in length, the cross-member or cover support element and pivot arms are rigidly connected, thereby tying the two pivot arms together as described for example in U.S. Pat. No. 5,829,818. The tying of the two pivot arms together through a rigid connection with the cross-member, helps the arms to work in unison with each other as they pivot together between the first and second positions on the truck, and to keep the arms at a fixed width between each other as they pivot about their pivot point.

The problems with this type of rigid connection between pivot arms and cross-member are several. First, if the arms come into contact with the container, or any objects protruding from the container, both arms are likely to be affected and possibly be damaged together along with the cross-member tying the arms together. Excessive external force experienced by one arm, can be transmitted through the rigid cross-member to the other arm, causing damage to both arms and cross-member. Also, with a rigid cross member, telescopic arms must be synchronized very closely in order to prevent the arms from binding as they telescope.

SUMMARY OF THE INVENTION

The present invention has been devised in order to address the deficiencies in the prior art.

According to the present invention there is provided a cover assembly for the container of the vehicle having a container having first and second ends; wherein the cover assembly comprises a retractable cover having a first end attached to a roller assembly and a second end attached to a cover support element. The cover support element has first and second ends, each of which is joined by means of a union at the upper end of a pair of pivot arms, each of said pivot arms being pivotable about a lower end thereof at a point intermediate the first and second ends of the container and adjacent the bottom of the container, between a first position in which the cover support element is adjacent the first end of the container and a second position in which the cover support element is adjacent the second end of the container. The union between the pivot arms and cover support element is a flexible joint.

Preferably, the flexible joint incorporates a pivoting element between the cover support element and the pivot arms, throughout a vertical plane parallel with the pivot arms.

Preferably, the flexible joint incorporates a sliding element between the cover support element and the pivot arms, through the longitudinal axis of the cover support element.

Preferably, the flexible joint incorporates an axial rotation element between the cover support element and the pivot arms, around the longitudinal axis of the cover support element.

Suitably, the flexible joint is a ball joint assembly. Alternatively the flexible joint may be an assembly of flexible rubber, spring material, or other suitable material.

BRIEF DESCRIPTION OF THE DRAWINGS

The above and other aspects of the present invention will now be described in further detail, by way of example only, with reference to the accompanying drawings, in which:

FIG. 3 is a schematic part top view of a flexible joint in the preferred embodiment;

FIG. 4 is a schematic part side view of the flexible joint of FIG. 3;

FIG. 5 is a schematic end view of the flexible joint FIG. 3; and

FIG. 6 is a schematic part side view of an alternative embodiment of a flexible joint.

With reference initially to FIG. 1, there is illustrated an embodiment of the apparatus of the present invention in a configuration in which a flexible cover or tarp 6 is fully retracted leaving a container 7 open. Container 7 is mounted upon a truck chassis 8 which includes the usual components, wheels, engine, cab etc. Typically, the truck is of the type including a tipping arrangement to raise the front end of the container, thus causing the contents of the container to be ejected from a pivoting door in the rear of the container. Such vehicles and their operating mechanisms are well known in the art and will not be described in any further detail. FIG. 2 depicts the same embodiment of the apparatus of the present invention in which the cover 6 is fully extended, thereby covering container 7. Pivot arms 3 are attached to the truck frame or container body at pivot points 4 and pivot about pivot points 4. Flexible joints 1 are located at the upper ends of each pivot arm 3 and are joined together by cross-member 2. In the preferred embodiment, the flexible joint is shown in FIG. 3, FIG. 4, and FIG. 5 as a ball joint. FIG. 3 and FIG. 4 show the ball joints 1 able to pivot up and down and from side-to-side, throughout a vertical plane that is parallel with the pivot arms. This movement of the ball joints allows the cross-member 2 to pivot anywhere up to approximately 50 degrees from horizontal in the directions shown in FIG. 3 and FIG. 4. FIG. 4 also illustrates how ball joint 1 is capable of sliding over cross-member 2 between stops 5 on the inside and outside of the pivot arm/ball joint assembly. FIG. 5 illustrates how cross-member 2 can also rotate 360 degrees about its longitudinal axis due to the bearing-like properties of ball joints 1. This allows cross-member 2 to maintain contact with the flexible cover 6 by rotating naturally with the flexible cover as it is wound onto the roller assembly 9.

Figure 1:
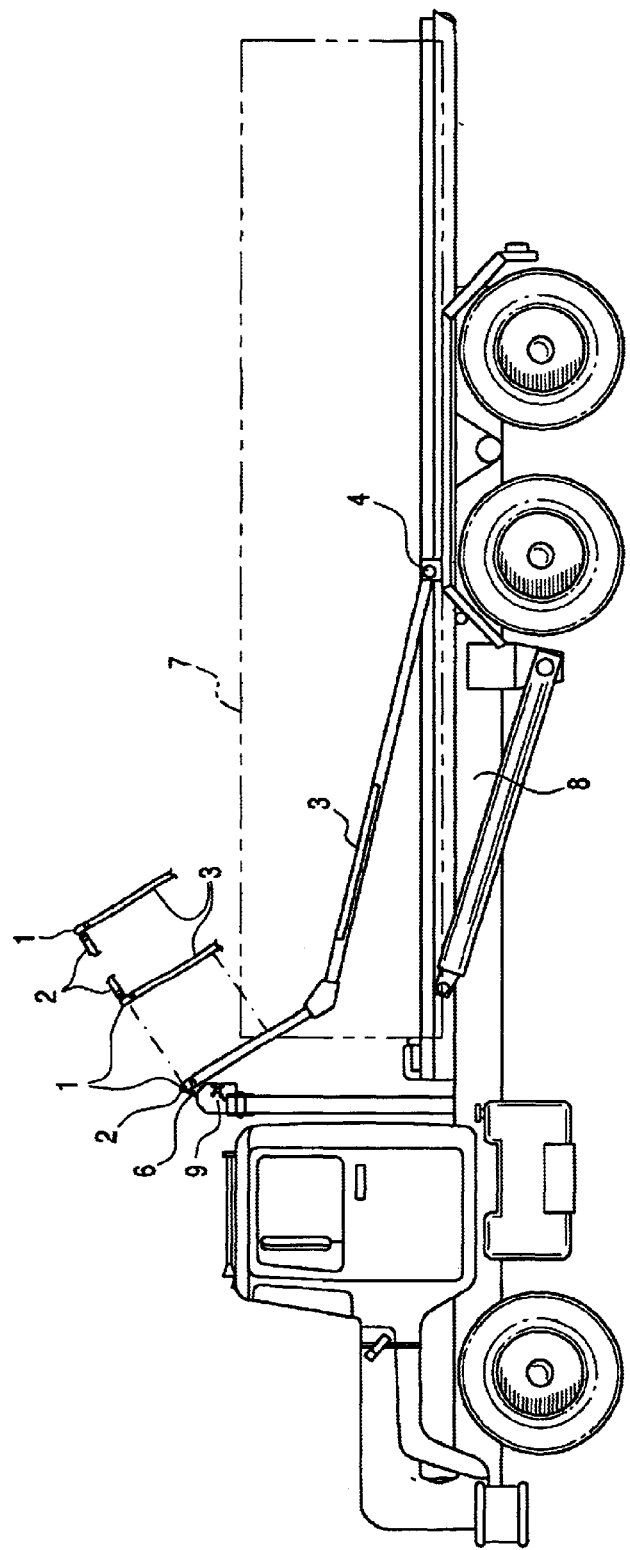
FIG. 1 is a schematic side view of a truck having a covering assembly in accordance with the present invention with the flexible cover in retracted configuration.
Figure 2:
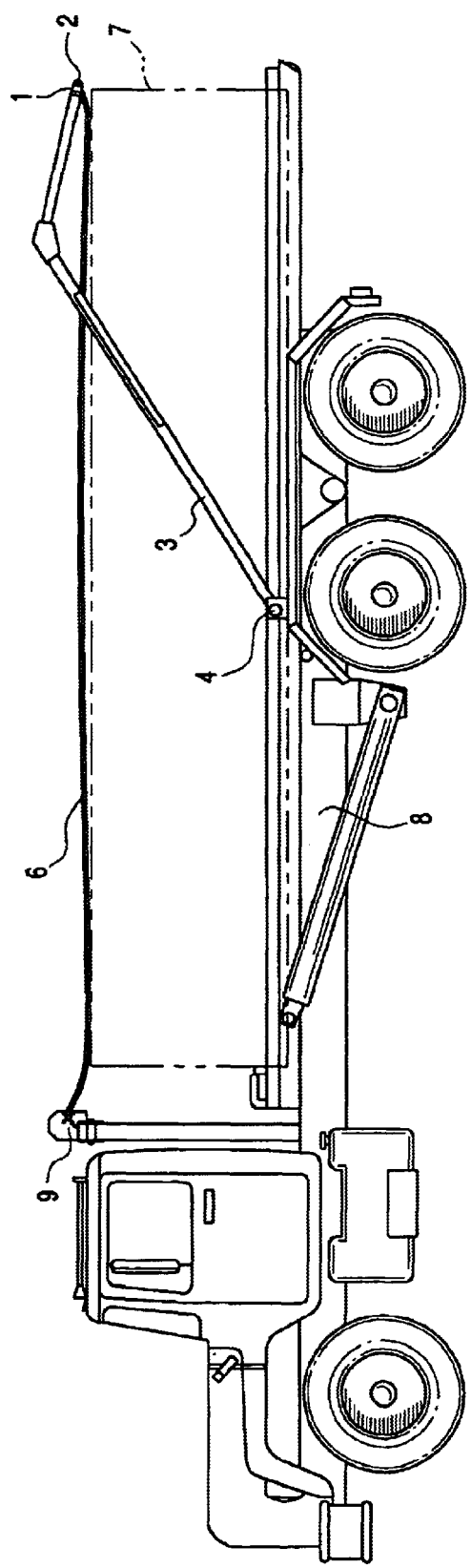
FIG. 2 is a schematic side view of a truck having a covering assembly in accordance with the present invention with the flexible cover in an extended configuration.

An alternative embodiment is described in FIG. 6 in which the flexible joint is in the form of a flexible coil spring 10, bent at a ninety degree angle to join the pivot arms 3 and cover support element 2. Alternative materials that may be appropriate to substitute for the flexible coil spring such as flexible rubber.

What is claimed is:

1. A cover assembly for a container of a vehicle having a container having first and second ends; wherein the cover assembly comprises, a retractable cover having a first end attached to a roller assembly and a second end attached to a cover support element wherein said cover support element has first and second ends each of which is joined by means of a union to a respective upper end of each of a pair of pivot arms, said pivot arms being pivotable about a lower end thereof at a point intermediate the first and second ends of the container and adjacent a bottom of the container, between a first position in which said cover support element is adjacent the first end of the container and a second position in which said cover support element is adjacent the second end of the container said union between said pivot arms and cover support element is a flexible joint and said flexible joint incorporates a pivoting feature between the cover support element and pivot arms, throughout a vertical plane parallel with said pivot arms.

2. A cover assembly as claimed in claim 1 wherein said flexible joint incorporates a sliding feature between said support element and said pivot arms, through the longitudinal axis of said cover support element.

3. A cover assembly as claimed in claim 1 wherein said flexible joint incorporates an axial rotation feature between said cover support element and said pivot arms, around the longitudinal axis of said cover support element.

4. A cover assembly as claimed in claim 1 wherein said flexible joint comprises a ball joint assembly.

5. A cover assembly as claimed in claim 1 wherein said flexible joint comprises an assembly of flexible rubber or spring material.

* * * * *